United States Patent

[11] 3,586,438

[72] Inventor Robert P. Gyori
Thousand Oaks, Calif.
[21] Appl. No. 720,926
[22] Filed Apr. 12, 1968
[45] Patented June 22, 1971
[73] Assignee Metro-Goldwyn-Mayer, Inc.
Culver City, Calif.

[54] AUTOMATIC CURING AND CONTROL SYSTEM FOR OPTICAL PRINTERS AND THE LIKE
24 Claims, 4 Drawing Figs.

[52] U.S. Cl. .......... 355/103, 355/83, 355/88
[51] Int. Cl. .......... G03b 27/10
[50] Field of Search .......... 355/88, 103, 97, 98, 83

[56] References Cited

UNITED STATES PATENTS

| | | | |
|---|---|---|---|
| 2,851,676 | 9/1958 | Woodcock et al. .......... | 340/174 |
| 2,943,554 | 7/1960 | Kastner .......... | 355/88 |
| 3,374,723 | 3/1968 | Baumbach .......... | 355/103 |
| 3,458,256 | 7/1969 | Stemke .......... | 355/88 |

*Primary Examiner*—Samuel S. Matthews
*Assistant Examiner*—R. L. Moses
*Attorney*—Fulwider, Patton, Rieber, Lee & Utecht

ABSTRACT: Programming and control apparatus for printing motion picture film and the like from a master negative film in accordance with a control tape which includes coded digital control data, the tape being moved and control being accomplished in response to appropriate cues indicating where the desired controls are to be effected in the printing process. Remote film frame cuing is achieved by counting frame numbers of the master negative film from a zero reference to thereby assign a unique address to each film frame, adding to the control tape data the addresses of the particular frame at which various controls are to be carried out, and sequentially comparing each master frame address with the next control tape address to command release of control data only upon address coincidence. Additional logic is also provided to enable the control tape to effectively achieve printer control in both the reverse and forward directions of movement of the master negative film.

A novel control tape printer and reader is also provided for writing and verifying control tape cues and control data.

INVENTOR.
ROBERT P. GYORI
BY Zulwider, Patton, Rieber Lee, and Utecht
ATTORNEYS

INVENTOR.
ROBERT P. GYORI
BY Fulwider, Patton, Rieber Lee, and Utecht
ATTORNEYS

INVENTOR.
ROBERT P. GYORI

BY Lulvider, Patton, Rieber Lee, and Utecht

ATTORNEYS

INVENTOR.
ROBERT P. GYORI
BY Fulwider, Patton, Rieber Lee, and Utecht
ATTORNEYS

AUTOMATIC CURING AND CONTROL SYSTEM FOR OPTICAL PRINTERS AND THE LIKE

BACKGROUND OF THE INVENTION

This invention relates generally to improvements in optical-printing systems of the type used in motion picture studios for printing positive duplicates from a master negative film and, more particularly, to a new and improved automatic cuing and control system for optical printers wherein remote film frame cuing is accomplished without physically altering the master negatives.

Optical printers are widely used in the motion picture industry for improvement of the photographed scene with respect to image density, composition, color balance and the like. More advanced printing machine designs have been used for creating special effects, such as dissolves, wipe-offs, reverse action, stop-motion, double exposures, dolly and "zoom" shots, and innumerable other special optical effects from film originally photographed in the studio by conventional camera techniques. The term "optical printer" as used herein is deemed to include any machine for printing motion picture film and includes both projection and contact printers.

In recent years, changes in light intensity, color and special optical effects have been accomplished on printing machines automatically, rather than manually, because of the high speed at which modern optical printers operate. In this connection, the various optical effects, color and light intensity variations are provided automatically in response to special dues physically provided directly on the master negative film to indicate where the various light and color changes, or special optical effects should be introduced. Typically, optical effects, color and light intensity control data are provided upon a digitally coded control tape which is preprinted with rows of the control data so as to be sequentially read by an appropriate tape reader, in response to the cues on the master negative film, whereby the control data is released automatically to accomplish the desired printer operation at the film frame providing the initiating cue.

Two cuing systems, notch and R.F., are commonly employed to provide cues on the negative film so that appropriate cuing pulses are generated and presented to the printer control system.

The most common cuing system is the notch type, wherein the contact roller of a cue reading switch rides the edge of the master film and is actuated by notches cut in the film edge at appropriate frames. Each time an edge notch passes the cue switch a cuing signal is generated to effect release of control data from the control tape.

The R.F. cuing system uses either single or double metallic patches or tabs along the edge of the master film, in combination with a proximity probe. Each time a tab passes through the magnetic field established by the sensing coil of the probe, an appropriate cuing signal is generated to command release of control data from the control tape.

Unfortunately, however, the aforedescribed control tape approach for automatic control of an optical printer has not proven entirely satisfactory, particularly in view of the required physical handling of the master negative film in order to insert appropriate cues, i.e., notches or tabs, at the proper film frames. In this regard, handling of the master negative film increases the risk of irreparable damage to the film, and the introduction of notches or metallic tabs along the edge of the film tends to weaken the film, enhance the likelihood of a film break, and in general shorten the overall useful life of the master negative film.

Hence, those concerned with the development and use of optical printers have long sought a new and improved system whereby cuing for the release of control data to initiate prescribed printing processes at specified film frames could be accomplished remotely without physically handling or modifying the master film. To this end, a number of synchronous control tape devices have been developed, wherein the control tape moves in synchronism with the master negative film, thereby eliminating the need to physically handle the film in order to program the cues. However, such approaches have not proven to be entirely satisfactory from the standpoint of reliability, speed and the ability to print in both the forward and reverse directions. The present invention obviates all of the aforedescribed difficulties.

SUMMARY OF THE INVENTION

Briefly, and in general terms, the present invention provides an improvement in automatic cuing and control systems for optical printers including means for counting film frames of the master negative film from a zero reference or sync frame to assign a unique address to each film frame. Each digitally coded control data group on a control tape, e.g. a plurality of binary rows, is preceded by the address number of the particular frame at which controls represented by the particular data group are to be effected, and means are provided for comparing the individual film frame addresses of the advancing master film in the optical printer with the next control tape address to command release of control data only upon address coincidence, whereby cuing is accomplished without the need to physically alter the master negatives in any way. A bidirectional counter and appropriate logic are provided to facilitate a reversible printing arrangement wherein the same control tape can effectively carry out control in both the reverse and forward directions of movement of the master negative film through the printer.

In addition, the present invention provides improved means for printing appropriate control tapes with the proper film frame cue addresses and control data, the improved system including appropriate read and write hardware for writing and verifying control tape information. This hardware includes a film frame address and control data programming keyboard, counters, a gated clock subsystem for running up the counters, memory modules, digital comparators for comparing data in the memory modules with the counters for encoding and decoding purposes, together with appropriate displays for verifying the information on the control tape.

By way of example, in a presently preferred embodiment, the automatic cuing and control system of the present invention includes a bidirectional tape reader with motorized drive, for reading a binary coded control tape or the like. The reader is under the control of a reader drive logic subsystem which receives an initiating "Go" command to advance the tape reader sequentially, one row at a time, in the forward or reverse direction depending upon conditioning signals received from appropriate forward-reverse logic. Each time the tape reader advances to a new row, the reader provides a plurality of true or false outputs for each of the coded positions of the particular row being read from the tape. These output signals are fed into a bank of selector gates which are conditioned by appropriate selector gate drive logic to pass the data read by the tape reader into the proper memory modules for storing the particular data represented by the particular row being read. In this regard, the cuing film frame address is read from the control tape and stored in a frame address memory module, and control data for color and other optical effects are stored in other appropriate memory modules for those types of information.

A bidirectional film frame transducer, in conjunction with the forward-reverse logic, counts the film frames of the master negative film with respect to a zero sync frame at the beginning of the master film roll and drives a bidirectional counter. Depending upon the direction of movement of the master film in the optical printer, the transducer and forward-reverse logic will issue commands to the counter to add or substract output pulses from the transducer, so that the counter always indicates the appropriate film frame address regardless of whether or not printing is being carried out in the forward or reverse directions. A digital comparator constantly compares the film frame address in the counter with the last film frame address read from the control tape and stored in the frame address memory module. Upon address coincidence, a control signal is generated to fire the various color and special optical effects systems, and to trigger the tape reader and reader logic for the purpose of receiving the next film frame cuing address and appropriate control data from the programmed control tape.

The aforedescribed invention quickly, easily and reliably prepares and verifies appropriate control tapes and provides a system for utilizing such tapes to rapidly, reliably and automatically program optical printer operation in both the forward and reverse printing directions while completely obviating the need for physical alteration of the master negative film to provide proper cues.

The above and other objects and advantages of this invention will become apparent from the following more detailed description, when considered in connection with the accompanying drawings of an illustrative embodiment thereof, and wherein:

DESCRIPTION OF THE PREFERRED EMBODIMENT

Figure 1:
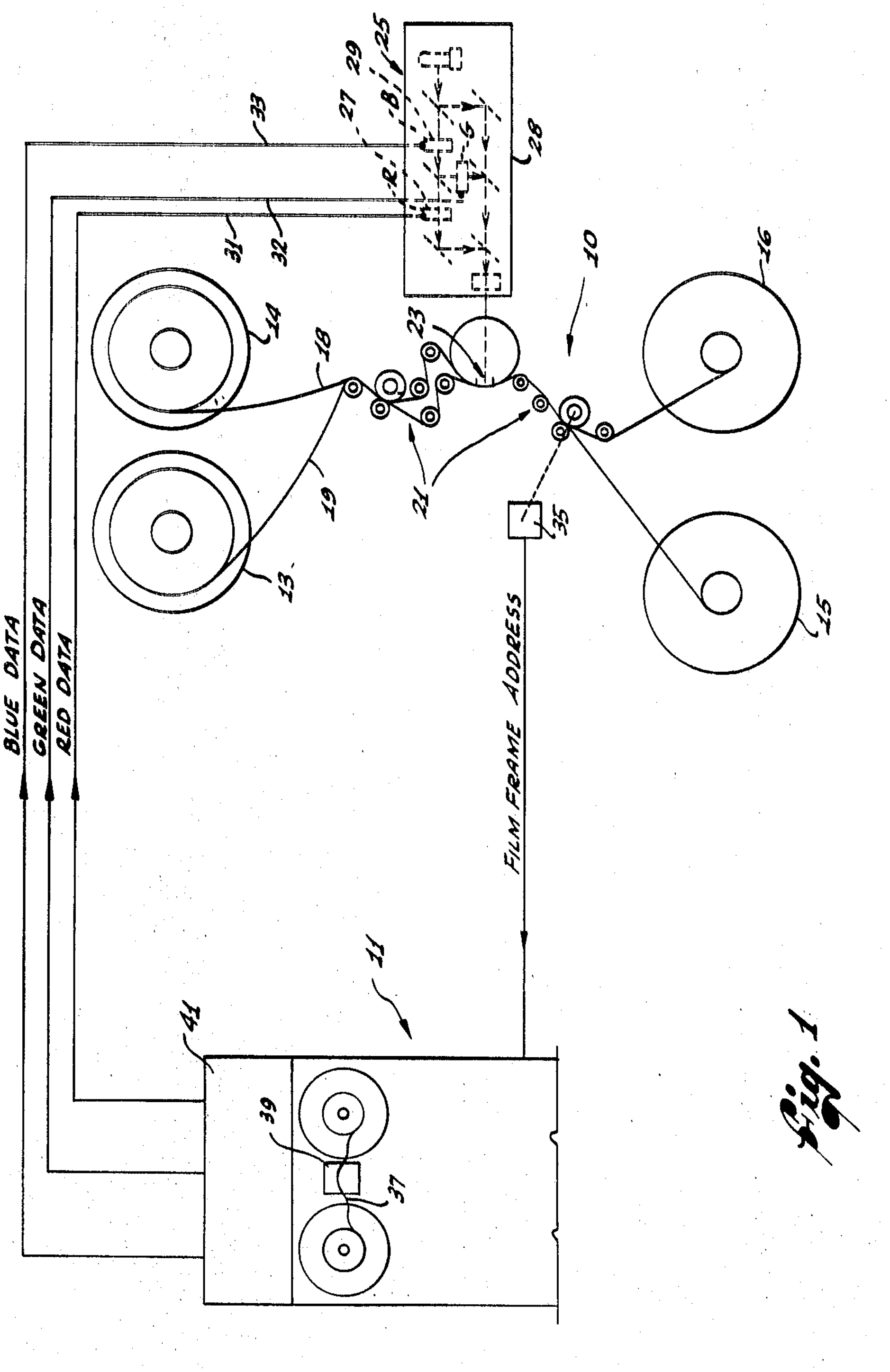
FIG. 1 is a combined schematic and elevational view of portions of an optical printer incorporating a cuing and control system in accordance with the present invention.

Referring now to the drawings, and more particularly to FIG. 1 thereof, there is shown a portion of an optical printer 10 incorporating a cuing and control system 11 in accordance with the present invention. The optical printer 10 includes appropriate film supply and takeup reels 13, 14, 15 and 16 for a master negative film 18 and raw stock positive printing film 19. In this connection, the individual reels 13—16 may function as either takeup or supply reels depending upon whether or not the printer 10 is operating in the forward or reverse printing mode.

A conventional film drive and guide roller arrangement 21 brings the master negative film 18 and printing film 19 together adjacent an appropriate printing aperture 23 while transferring the films from their respective supply reels to their respective takeup reels.

Printing is accomplished in the optical printer 10 by means of a conventional optical system 25 which typically includes a printing lens, optical condensers, dichroic mirrors, and variable light valves. Typically, one light valve is provided for each of the primary colors red, green and blue, e.g., light valves 27, 28 and 29, respectively, in the optical system 25.

Additional optical effects devices, such as faders and dousers (not shown), etc. may also be included in a typical optical system employed by the printer 10.

The master negative film 18 represents a plurality of photographed scenes, one for each negative film frame, which has been photographed in the studio or field by conventional camera techniques. However, the average image density and color balance in the developed master negative film 18 will vary over relatively wide limits from frame to frame because of the difficulties in accurately and continuously compensating or controlling, during filming, the numerous factors, such as lighting, changes in background scenery and lens opening, which affect the density and color balance of the developed master film. Accordingly, it has become necessary to selectively correct the individual film frames for these various factors during the printing of the developed master film 18 onto the positive film 19. This is accomplished in the optical printer 10 by varying such controls as the light valves 27, 28 and 29 to bring about light intensity and color balance changes which compensate the printed image in the manner desired. To this end, command control signals for each of the primary colors, blue, green and red are provided by the cuing and control system 11 over lines 31, 32 and 33, respectively, to adjust the light valves 27, 28 and 29, respectively, in accordance with a predetermined printing program. Of course, it will be appreciated that similar control signals may be provided for adjustment of other optical effects devices (not shown) in the printer 10.

Instead of notches or metallic tabs along the edge of the master film 18, to provide cuing information as to where the desired light changes or other optical effects are to be provided, a transducer 35 of any appropriate type, such as a photocell or direct mechanical drive device, monitors the film frame movement through the optical printer 10 and generates an electrical pulse each time a film frame passes the transducer detection station. The electrical output from the transducer 35 thus provides film frame address information to the cuing and control system 11 which includes an appropriate counting device and logic (not shown) for keeping track of film frame addresses with respect to a zero sync frame at the beginning of the master film roll and indicates the direction of movement, either forward or reverse, of the master film 18 through the printer 10.

The cuing and control system 11 compares the film frame address, as read by the transducer 35, with the cuing address on a control tape 37, as read by an appropriate reader 39. Release of light change control information over lines 31, 32 and 33 is accomplished only upon address coincidence, i.e., when the film frame address read by the transducer 35 is the same as the film frame address on the control tape 37 indicating where the next printing changes are to occur.

Control data storage, together with appropriate conditioning logic and comparators are provided in a suitable hardware console 41, adjacent the control tape 37 and reader 39 of the cuing and control system 11.

Figure 2:
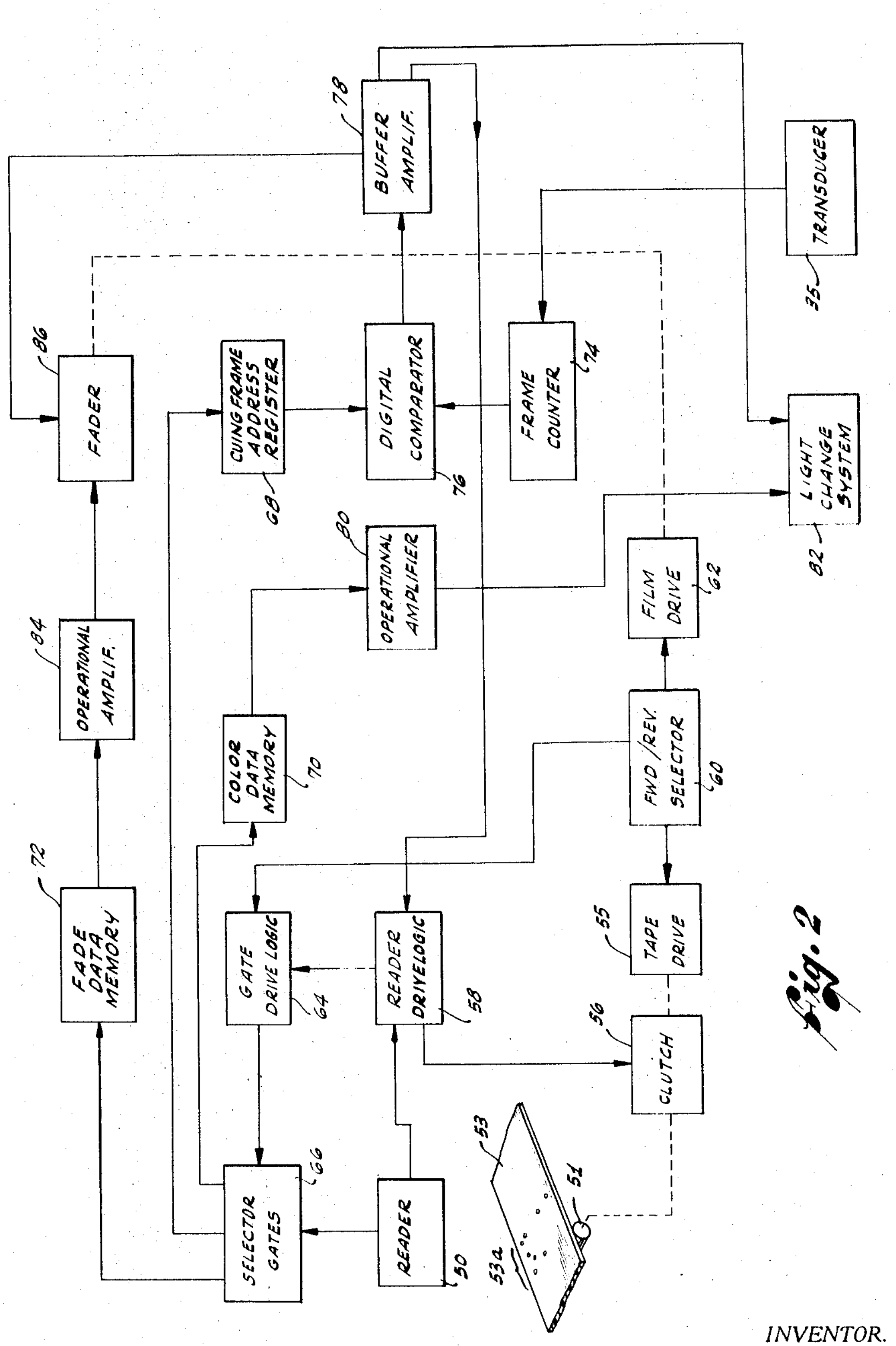
FIG. 2 is a more detailed block diagram of the overall automatic cuing and control system for optical printers, in accordance with the present invention.

Referring now more particularly to FIG. 2 of the drawings, there is shown an overall automatic cuing and control system in accordance with a presently preferred embodiment of the invention.

The cuing and control system includes a bidirectional tape reader 50 with a motorized drive roller 51 for advancing, upon command in either direction, a control tape 53 bearing data thereupon in the form of groups **53*a* of digitally coded cuing frame address and associated control information. By way of example, the data group 53*a* may include six rows with at least eight binary bits in each row. Typically, the first two rows of each data group 53*a*** indicate the cuing film frame address at which the various light changes and other optical effects represented by the next four rows of control data are to be carried out in the optical printer.

The control tape 53 may be any type of tape medium well known in the art, such as punched tape or magnetic tape, and the tape reader 50 may likewise take any appropriate form known in the art for reading the tape 53, e.g., optical, magnetic, feeler switches (electromechanical) and the like.

The drive roller 51 is mechanically driven by any suitable tape drive 55 in either direction through a clutch 56 which is selectively engaged and disengaged in accordance with commands received from reader drive logic 58.

A forward-reverse selector 60 simultaneously conditions the tape drive 55 and an appropriate film drive 62, to establish their directions of movement, and the selector 60 may typically comprise an electrical switch for reversing the polarity of each of the motor units used in the tape and film drives. The forward-reverse selector 60 also provides an appropriate forward or reverse conditioning signal to gate drive logic 64. Of course, it will be appreciated that the forward-reverse conditioning logic may be obtained directly from the logic associated with the film transducer 35 (see FIGS. 1 and 2), rather than deriving the conditioning signal from the selector 60.

The tape reader 50 reads the information upon the control tape 53 sequentially, one row at a time, and passes the information to a plurality of selector gates 66, the selector gates being under the control of the gate drive logic 64 to selectively pass the information into the proper memory unit for the particular data represented by the row being read from the control tape 53. In this regard, data read from the tape 53 and relating to the cuing film frame address at which the next controls are to be effected is fed to a cuing frame address register 68. Information relating to color control is fed to a color data memory 70, while information relating to other special optical effects, such as fader control, is fed to a fade data memory 72.

The transducer 35 monitors film frames of the master negative film 18 as it moves through the printer 10 in FIG. 1, with respect to a zero sync frame, and generates signals which command a bidirectional frame counter 74 to add or subtract output pulses from the transducer, so that the counter always contains a number which represents the unique address of the particular master film frame being read by the transducer.

A digital comparator 76 continuously compares the film frame address registered in the counter 74 with the cuing film frame address stored in the register 68 and, upon address coincidence, the comparator generates an output signal which is directed to a buffer amplifier 78 to provide an appropriate output control signal for triggering the various printer control operations represented by the last control data group 53*a* read from the tape 53, and for recycling the entire system to read the next data group on the control tape.

By way of example as to the various types of control that may be accomplished, it will be noted that the data stored in the color data memory 70 is passed through an operational amplifier 80 to an appropriate light change system 82. The operational amplifier 80 converts the relatively low level logic signals from the memory 70, typically of the order of 3.6 volts, to a much higher level output control signal, typically of the order of 60 volts, for operating the light change system 82.

Data from the fade data memory 72 passes through an operational amplifier 84 to an appropriate fader unit 86. The fader 86 is mechanically coupled to the film drive 62 so that fader operation will always be in synchronism with movement of the master film 18, regardless of the speed of the optical printer.

The electrical output of the digital comparator 76 is a single pulse, the width of the pulse being determined by the speed of the optical printer, since the duration of frame address coincidence depends upon the period of time that the particular cuing film frame remains in position, and the latter condition is obviously dependent upon the speed at which the optical printer is operating. However, the buffer amplifier 78 provides a constant output pulse width which is substantially independent of machine speed and is of proper width to reliably carry out control functions. In this regard, note that the output of the buffer amplifier 78 fires the light change system 82 and fader 86, and also commands the reader drive logic 58 to engage the clutch 56 so that the driver roller 51 can advance the control tape 53 by another six rows.

The function of the reader drive logic 58 is to command the reader drive system to advance a predetermined number of data rows and to then stop. As the tape 53 is advanced, the reader 50 continuously informs the reader drive logic 58 as to which particular data row is being read. The reader drive logic, in turn, informs the gate drive logic 64 as to which particular row of data is being read by the reader 50 at any particular moment, and this latter information is combined by the gate drive logic with the forward-reverse conditioning signals received from the selector 60 to condition the selector gates 66 so that only those selector gates are enabled at any particular time which will pass the data row information being read to the proper memory unit for storing that particular class of information represented by the data row being read.

When the reader drive logic 58 receives a "Go" command, it engages the clutch 56 and advances the control tape 53 sequentially, one row at a time, in the forward or reverse direction depending upon the direction of movement of the tape drive 55. Each time the control tape 53 is advanced to another data row, the reader 50 provides a plurality of true or false outputs for each of the coded positions of the particular data row being read from the tape. These output signals are fed over a plurality of lines into the selector gates 66.

By way of example, if the system logic indicates forward operation of the optical printer, and the first data row in the data group 53*a* is read, then the gate drive logic 64 conditions the selector gates 66 so that the eight bit input (true or false) is converted into actual binary digital values between $2^0$ and $2^7$. When the second data row is read from the tape 53, the gate drive logic 64 commands the selector gates to convert the eight bit code into values between $2^8$ and $2^{15}$.

The next three rows of data are passed by the selector gates to the color data memory 70, while the last row of data is passed to the fade data memory 72.

When the system logic indicates that the optical printer is operating in reverse, the control tape 53 is moved backwards. The gate drive logic 64 then commands the selector gates 66 to accept the first row of data as fade memory data, the next three rows of data as color data in reverse order, the fifth row of data as a portion of a cuing film frame address number with a value between $2^8$ and $2^{15}$, and the last row of data as a film frame address number with a value between $2^0$ and $2^7$.

It will be apparent that the cuing film frame address forming part of each control data group 53*a* upon the tape 53 is denoted by two sequential rows to provide a total of 16 binary bits representing digital values between $2^0$ and $2^{15}$. With this 16 bit binary arrangement, a conventional computer tape can record the total number of film frames in approximately 4,000 feet of any type of film frame format.

The cuing frame address register 68 may take any form well known in the art and is typically in the form of 16 flip-flops. Depending upon the signals passed by the selector gates 66, each of these 16 flip-flops is conditioned to its true or false state to store the binary equivalent of the cuing film frame address.

The digital comparator 76 may be any appropriate comparator known in the art, and is typically a bank of exclusive-OR gates conditioning an output Nand gate (not shown). With this latter arrangement, the address stored in the register 68 is compared bit by bit, with the film frame address at any particular moment in the frame counter 74. Upon address coincidence, i.e., matching of every bit in the register 68 with every bit in the counter 74, the output Nand gate passes a pulse to the buffer amplifier 78 to fire the various optical printer control systems which have been previously conditioned in accordance with data read from the control tape 53. The output pulse from the amplifier 78 also recycles the reader drive logic so that the next control data group 53*a* can be read by the reader 50.

The tape drive 55 and reader 50 are designed to operate more rapidly than the film drive 62 so that appropriate control data and address information is always stored in memory before the appropriate cuing film frame is indicated by the transducer 35 as being in the proper position for the programmed controls to become effective.

Figure 3:
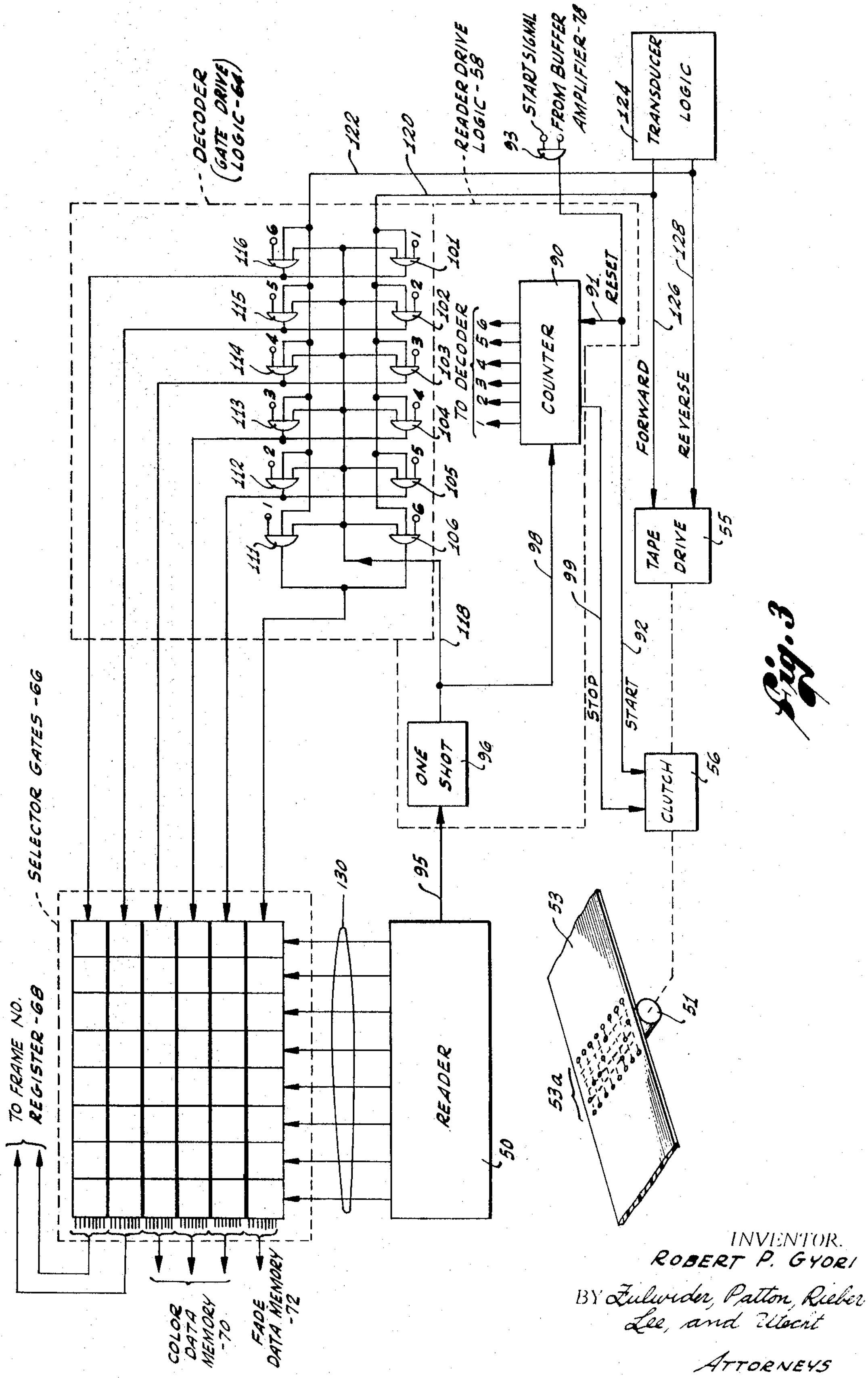
FIG. 3 is a block diagram illustrating additional details of some of the subsystems embodied in the overall system of FIG. 2.

Referring now more particularly to FIG. 3 of the drawings, additional details of the system logic, and particularly that of the reader drive logic 58, gate drive logic 64 and selector gates 66 will become apparent.

The reader drive logic 58 includes a counter 90 which counts in single steps from "0" through "6" and has a plurality of electrical outputs, one output for each of the counter states "1" through "6."

The counter 90 is placed in its "0" state by an appropriate "reset" signal over line 91. The source of this "reset" signal is normally the electrical output from the buffer amplifier 78 in FIG. 2, or, if printer operation is first being initiated, an appropriate "start" signal may be generated in any convenient manner. The "start" signal and the output from the buffer amplifier 78 can be fed through an Or gate 93 so that either signal can provide the necessary "reset" signal for the counter 90. The "reset" signal also provides a "start" over line 92 which commands engagement of the clutch 56 to initiate advancement of the control tape 53.

Each time a new data row of the data group 53*a* is read by the reader 50, a pulse is generated by the reader and is fed over line 95 to an appropriate "one-shot" device 96, typically a monostable circuit of the Eccles-Jordan type, to generate a pulse of uniform and prescribed width for stepping the counter 90 over line 98.

The counter 90 counts from "1" through "6," until all six rows of the data group 53*a* have been read. When the counter 90 reaches the state "6," the count of "6" is immediately decoded as a "stop" command over line 99 to disengage the clutch 56 and thus stop the drive roller 51 from further advancement of the control tape 53.

The gate drive logic 64 is a bidirectional decoder for the counter 90. The decoder includes two banks of six gates each, gate groups 101—106 and 111—116. Gates 101—106 decode the counter state in the normal forward count direction when the optical printer is set for forward printing, whereas gates 111—116 decode the counter output in the reverse direction when the optical printer is set for reverse printing.

All of the gates 101—106 and 111—116 are AND gates receiving as one common input the output pulse from the one-shot 96 over line 118. Each gate also receives one of the output count indicating lines from the counter 90. In addition, the forward count decoding gates 101—106 receive a common enabling input signal over line 120 indicating forward printer operation. Similarly, each reverse count decoding gate 111—116 receives a common enabling input signal over line 122 indicating that the printer is operating in the reverse direction.

In the embodiment of the invention shown in FIG. 3, appropriate forward-reverse logic signals are provided by an appropriate transducer logic subsystem 124 receiving information from the transducer 35 in FIG. 2, and the forward and reverse commands are also directed over lines 126 and 128, respectively, to the tape drive 55 to establish the direction of movement of the control tape 53.

All of the data read from each data row of the control tape 53 by the reader 50 is directed over eight output lines 130, one line for each bit, as parallel input to six banks of selector gates 66. However, only one bank of selector gates 66 is enabled to pass information at any one time, depending upon the particular row of data being read. In this connection, the counter 90 always indicates how many data rows of a particular data group 53*a* have been read, and the gate drive logic 64 decodes the counter state in accordance with appropriate forward-reverse command signals so that only one bank of selector gates 66 is enabled at any one time, the particular bank being enabled by an output pulse from a single decoder gate corresponding to the particular data row being read by the reader. In this regard, each bank of selector gates has eight outputs, one output for each gate, with the outputs for each selector gate bank feeding an appropriate data memory unit.

The selector gates 66 may employ either And or Nand logic, Nand gates being presently preferred by virtue of lower cost.

Figure 4:
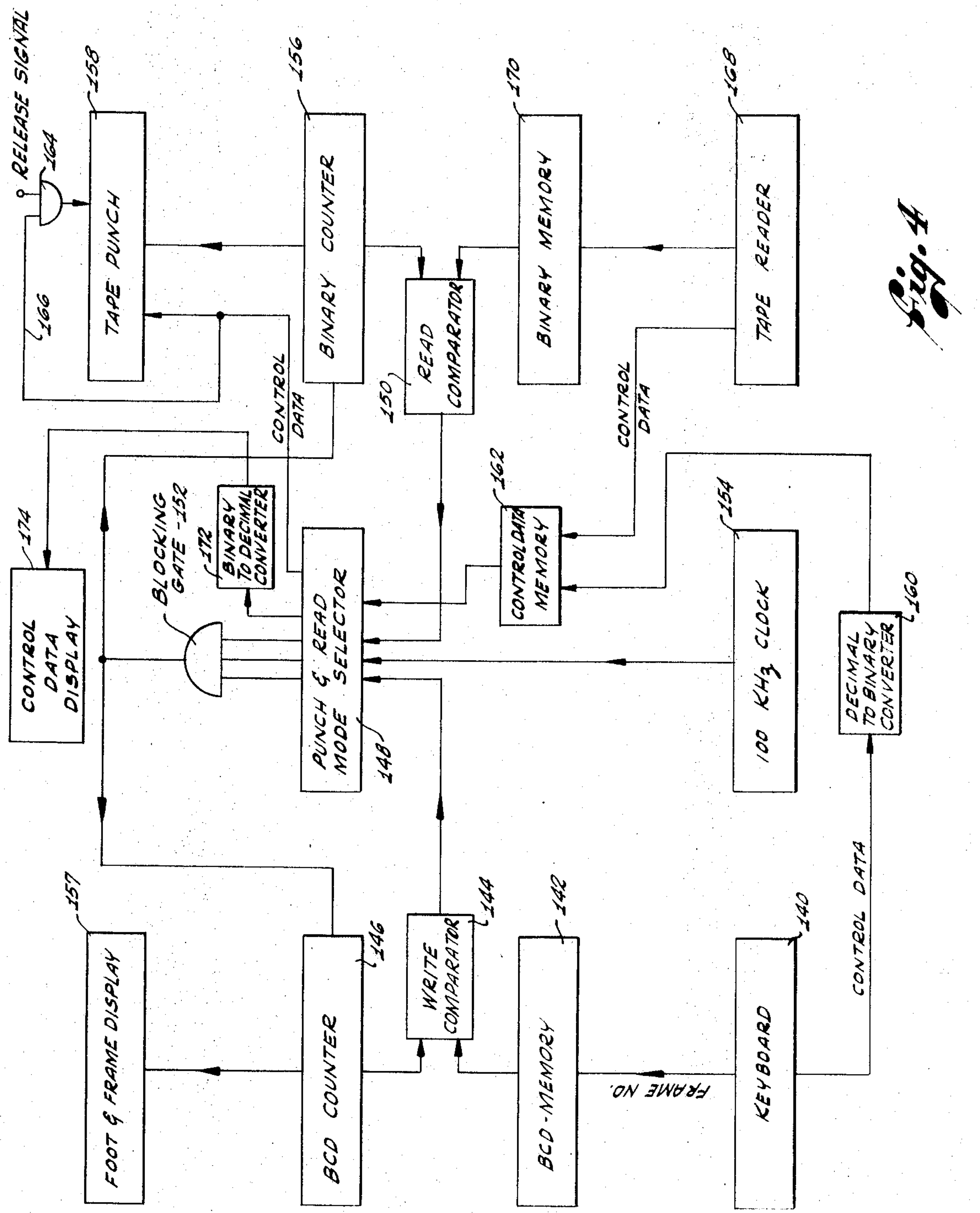
FIG. 4 is a block diagram of a system for punching and verifying control tapes for use in the system of FIG. 2.

Referring now to FIG. 4 of the drawings, there is shown a system for writing and verifying control tapes such as the tape 53 used in the embodiments of FIGS. 2 and 3. By way of example, the system of FIG. 4 is directed to a tape-punching apparatus. However, it will be apparent to those of ordinary skill in the art that the same system may be readily adapted to the writing of control tapes in any desired digital form, e.g., magnetic tape, without in any way departing from the spirit and scope of the present invention.

A programming keyboard 140 includes a number of keys for punching film frame numbers or foot and frame numbers, as desired, as well as additional key rows for punching control data in decimal values representing the various light change and other special effects to be selectively accomplished by the optical printer in accordance with programmed control tape instructions. Cuing film frame address number information, as punched on the keyboard 140, is stored in an appropriate memory 142 which may be in any desired number system, but is preferably in decimal or binary coded decimal form.

The memory 142 provides a set of electrical inputs to one side of a write comparator 144, another set of inputs to the other side of the comparator being from a binary coded decimal counter 146. While the counter 146 is illustrated as being in the binary coded decimal number system, the only limitation on the counter is that it be in the same number system as the memory 142 feeding the comparator.

The write comparator 144 is a digital comparator similar to the digital comparator 76 in the system of FIG. 2, and is typically of the exclusive-OR type for comparing the numbers in the memory 142 and counter 146 bit by bit. The comparator 144 provides a signal output only when the numbers in the memory 142 and counter 146 are identical.

Normally, when the keyboard is punched to initially place a frame number in the memory 142, the counter 146 will not yet have been run up to equality with the memory and, accordingly, there is no output from the comparator 144.

A "punch" and "read" mode selector 148 is provided, the selector being essentially a switching arrangement to determine whether or not the write comparator 144 or an identical read comparator 150 will control the enabling input circuit of a blocking gate 152, the latter gate typically employing Nand logic.

With the selector 148 in the "punch" mode, the write comparator 144 controls the blocking gate 152 and, in the absence of equality between the memory 142 and the counter 146, enables the gate 152 to pass counting pulses from a high frequency clock 154, typically operating at 100 kilohertz, to both the binary coded decimal counter 146 and a binary counter 156. The clock pulses are passed by the gate 152 until the counter 146 runs up to equality with the memory 142, at which time an output pulse is provided by the write comparator 144 to disable the blocking gate 152, thereby preventing any additional counting pulses from reaching the counters 146, 156 and thus stopping both of the latter counters at their particular number system equivalents of the number stored in the memory 142. Hence, the system of FIG. 4 automatically encodes from the number system of the keyboard 140 and/or the number system of the memory 142 to the number system of the counter 156. In the illustrative example of FIG. 4, the counter 156 counts in the binary number system.

The counter 146 also drives a display indicating foot and frame or frame number, as desired, so that the encoded frame number can be quickly verified with the frame number punched on the keyboard 140.

The binary counter 156 conditions the film frame address punching arms (not shown) of a suitable tape punch 158 so that the information introduced via the keyboard 140 can be selectively transferred in binary form to an appropriate control tape, punch card, or the like.

The control data punched on the keyboard 140 is directed to any suitable decimal-to-binary converter 160, and then to an appropriate control data memory 162. With the selector 148 in the "punch" mode, the output from the memory 162 conditions the light change and opticals effects punch arms of the tape punch 158 in the same manner as the frame number punch arms are conditioned by the counter 156.

With the tape punch 158 thus conditioned by the binary counter 156 and control data memory 162, actuation of the tape punch 158 to transfer information in suitably coded form to the control tape 53 of FIG. 2 is accomplished by generating an appropriate "release" signal, e.g., as by an operator-actuated release button. The "release" signal is ANDed by a gate 164 with a second signal received over line 166 indicating the existence of control data in the memory 162. Hence, initiation of the "release" signal will actuate the tape punch 158 through gate 164 only if the control data information has been punched on the keyboard 140. This safety arrangement prevents inadvertent punching of a control tape with incomplete information.

When selector 148 in the system of FIG. 4 is placed in the "read" mode, control of the blocking gate 152 is transferred from the write comparator 144 to the read comparator 150. In this connection, the cuing frame number data rows read from a control tape by a tape reader 168 are directed to a binary memory 170 which provides input to one side of the read comparator 150, the other side of the comparator 150 receiving input from the binary counter 156.

Normally, the binary number stored in the counter 156 and memory 170 will not be equal and, hence, there will be no output from the comparator 150. Under these conditions, the blocking gate 152 passes counting pulses from the clock 154 simultaneously to both the binary coded decimal counter 146 and the binary counter 156. When the number in the counter 156 is equal to the number stored in the memory 170, the read comparator 150 provides an output signal which closes the gate 152. At this point, the binary coded decimal counter 146 contains the equivalent in its number system of the number stored in binary form in the memory 170. The number stored in the counter 146 is, of course, visually observable via the display 157.

The control data for the particular cuing frame address shown by the display 157 is also read by the tape reader 168 and directed to the control data memory 162. With the selector 148 in the "read" mode, the data contained in the memory 162 is directed to a binary-to-decimal converter 172, as opposed to the tape punch 158. The converter 172 drives an appropriate control data display 174.

Hence, the displays 157 and 174 enable quick and easy verification of the cuing film frame addresses and associated control data on the control tape, by comparison with the information originally programmed by the keyboard 140 and punched by the tape punch 158.

In the system of FIG. 4, appropriate gating and reset signal hardware for clearing the various counters and memory units between various sets of information groups has been omitted for purposes of simplicity. However, those of ordinary skill in the digital design art can readily provide such hardware by conventional design techniques.

The present invention satisfies a long existing need in the optical printing arts for a system which quickly, reliably and automatically programs optical printer operation in both the forward and reverse printing directions while completely obviating the need for any physical alteration of the master negative film to provide proper cues, thus minimizing the possibility of irreparable damage to the master film and enhancing film life. In addition, the present invention provides unique means for quickly, easily and reliably preparing and verifying appropriate control tapes for utilization by the automatic cuing and control system.

It will be apparent from the foregoing that, while particular forms of the invention have been illustrated and described, various modifications can be made without departing from the spirit and scope of the invention. Accordingly, it is not intended that the invention be limited, except as by the appended claims.

I claim:

1. An automatic cuing and control system for optical printers, comprising:

a reader means for reading a digitally coded control element bearing information relating to cuing film frame addresses;

cuing film frame address memory means for storing each film frame address read by said reader means;

control data memory means for storing control data associated with said address stored in said film frame address memory means, said control data being adapted to condition variable control means of an optical printer;

a counter means for continuously indicating the film frame address of each frame of a master film with respect to a predetermined reference position;

and a digital comparator means for comparing the address indicated by said counter means with the cuing address stored in said cuing film frame address memory means, said comparator means providing an output control signal, only upon address coincidence, to selectively enable actuation of said variable control means in accordance with said control data stored in said control data memory means.

2. A system as set forth in claim 1, wherein said control data associated with said address is read by said reader means from the same control element bearing said cuing film frame addresses.

3. A system as set forth in claim 1, wherein said control element is a coded tape.

4. A system as set forth in claim 1, and further including a transducer means for monitoring movement of said master film through an optical printer, said transducer means providing output pulses to drive said counter means.

5. A system as set forth in claim 1, and further including: reader logic means responsive to said output control signal from said comparator means to advance said reader means so that a new cuing film frame address is read by said reader means.

6. A system as set forth in claim 5, and further including: selector gate means responsive to the output of said reader means and conditioned by said reader logic means for selectively routing information read by said reader means to the appropriate memory means.

7. A system as set forth in claim 5, wherein said reader means is a tape reader and includes a tape drive connected to a selectively engageable clutch;

and said reader logic means provides output signals for selectively engaging and disengaging said clutch.

8. A system as set forth in claim 1, wherein said reader means is a bidirectional reader and said counter means is a bidirectional counter.

9. A system as set forth in claim 8, and further including:

reader logic means responsive to said output control signal from said comparator means to selectively advance said reader means so that new information is read by said reader means from said control element;

forward-reverse logic means for sensing the direction of movement of said master film;

gate drive logic means conditioned by said reader logic means and said forward-reverse logic means;

and selector gate means responsive to the output of said reader means and conditioned by said gate drive logic means for selectively routing information read by said reader means to the appropriate memory means.

10. In an automatic cuing and control system for an optical printer having variable control means, the combination comprising:

a control tape, said control tape bearing digitally coded information thereon relating to cuing film frame addresses and associated control data;

a tape reader means for selectively reading information from said control tape;

cuing film frame address memory means for storing each film frame address read by said reader means;

control data memory means for storing said associated control data, said control data being adapted to condition said variable control means;

a transducer means for monitoring movement of a master film through said optical printer, said transducer means providing output pulses indicating the number of film frames monitored by said transducer;

a counter means for receiving the pulses from said transducer means, said counter means continuously indicating the film frame address of each frame of said master film with respect to a predetermined reference frame;

and a digital comparator means for comparing the address indicated by said counter means with the cuing address stored in said cuing film frame address memory means, said comparator means providing an output control signal only upon address coincidence, to selectively enable actuation of said variable control means in accordance with said control data stored in said control data memory means.

11. A combination as set forth in claim 10, including logic means responsive to said output control signal from said comparator means to selectively advance said reader so that new information is read by said reader means from said control tape;

and selector gate means responsive to the output of said reader means and conditioned by said logic means for selectively routing information read by said reader means to the appropriate memory means.

12. A combination as set forth in claim 11, wherein said reader means includes a tape drive connected to a selectively engageable clutch;

and said logic means provides output signals for selectively engaging and disengaging said clutch.

13. A combination as set forth in claim 12, wherein said reader means is a bidirectional reader and said counter means is a bidirectional counter.

14. A combination as set forth in claim 13, and further including:

forward-reverse logic means for sensing the direction of movement of said master film and for conditioning said tape drive and said selector gate means.

15. An automatic cuing and control system for an optical printer having variable control means, comprising:

a control tape bearing digitally coded information thereon relating to cuing film addresses and associated control data;

a reader means for reading the information from said control tape, said reader means having a motorized tape drive coupled to a selectively engageable clutch;

cuing film address memory means for storing each film frame address read by said reader means;

a plurality of control data memory means for storing various types of control data associated with said address stored in said cuing film frame address memory means, said control data being adapted to condition said variable control means of said optical printer;

a transducer means at a prescribed detection station for monitoring movement of said master film through said optical printer, said transducer means providing an output electrical pulse for each film frame moving past said detection station;

a counter means, responsive to output pulses from said transducer means, for continuously indicating the film frame address of each frame of said master film with respect to a predetermined sync frame;

a digital comparator means for comparing the address indicated by said counter means with the cuing address stored in said cuing film frame address memory means, said comparator means providing an output control signal, only upon address coincidence;

buffer amplifier means for providing a substantially uniform width pulse output in response to each output control signal from said comparator means, to selectively enable actuation of said variable control means in accordance with said control data stored in said control data memory means;

reader logic means responsive to the pulse output from said buffer amplifier means to selectively engage said clutch and advance said reader means so that new information is read by said reader means from said control tape;

forward-reverse logic means for indicating the direction of movement of said master film through said optical printer and for conditioning said tape drive so that said reader is advanced in the same direction as the direction of movement of said master film;

gate logic means conditioned by said reader logic means and said forward-reverse logic means;

and selector gate means responsive to the output of said reader means and conditioned by said gate logic means for selectively routing the information read by said reader means to said cuing film frame address memory means and said control data memory means.

16. A method capable of providing a synchronous automatic cuing and control for printing from a master film, comprising the steps of:

assigning a unique address to each film frame of said master film;

storing a cuing film frame address and associated control data;

continuously monitoring the addresses of film frames at a prescribed location;

comparing the monitored addresses with the stored cuing address;

and automatically effecting the control represented by said control data upon the occurrence of equality between a monitored address and said cuing address.

17. A data writing system for digitally coded data, comprising:

programming means for introducing control data;

a memory conditioned in accordance with said control data;

a first counter means for counting in the same number system as said memory;

a digital comparator means for comparing the data in said first counter with the data in said memory, said digital comparator means having an output line over which an output control signal is provided only upon data coincidence;

a second counter means for counting in a number system which is different than the number system of said memory;

a clock source means for generating clock pulses; and a normally open blocking gate means for passing said clock pulses simultaneously to said first counter means and said second counter means, said gate means being conditioned to a pulse blocking state of said output control pulse from said digital comparator means, whereby said first and said second counter means contain the numerical equivalents of the data in said memory.

18. A system as set forth in claim 17, wherein said programming means is a decimal keyboard.

19. A system as set forth in claim 17, wherein said second counter means counts in the binary number system.

20. A system as set forth in claim 17, and further including:

a data writing device conditioned by the counting state of said second counter means.

21. A system as set forth in claim 17, and further including:

display means for displaying the numerical equivalent of the number contained in said first counter means.

22. A data reading and display system for digitally coded data, comprising:

a reader means for reading data from a digitally coded control element;

a memory conditioned in accordance with the data read by said reader;

a first counter means for counting in the same number system as said memory;

a digital comparator means for comparing the data in said first counter means with the data in said memory, said digital comparator means providing an output control signal, only upon data coincidence.

a second counter means for counting in a number system different than the number system of said memory;

a clock source means for generating clock pulses;

a normally open blocking gate means for passing said clock pulses simultaneously to said first counter means and said second counter means, said gate means being conditioned to a pulse blocking state by said output control pulse from said digital comparator means, whereby said first and said second counter means contain the numerical equivalents of the data read by said reader means; and display means for displaying the numerical equivalent of the number contained in said second counter means.

23. A data-writing and -verifying system for digitally coded data, comprising:

keyboard means for introducing digital data;

a first memory conditioned in accordance with said digital data;

a first counter means for counting in the same number system as said first memory;

a first digital comparator means for comparing the data in said first counter means with the data in said first memory, said first digital comparator means providing an output control signal only upon data coincidence;

a second counter means for counting in a number system different from the number system of said first memory;

a reader means for reading data from a coded control element;

a second memory conditioned in accordance with said data read by said reader means and in the same number system as said second counter means;

a second digital comparator means for comparing the data in said second counter means with the data in said second memory, said second digital comparator means having an output line over which an output control signal is provided only upon data coincidence;

a clock source means for generating clock pulses;

a selector means for selecting one or the other of the output lines from said first and said second digital comparator means;

a normally open blocking gate means for passing said clock pulses simultaneously to said first and said second counter means, said gate means being conditioned to a pulse blocking state by an output control pulse from either of said digital comparator means; and display means for displaying the numerical equivalent of the number contained in said first counter means.

24. A system as set forth in claim 23, and further including:

a data writing device conditioned by the counting state of said second counter means.

PO-1050
(5/69)

UNITED STATES PATENT OFFICE
CERTIFICATE OF CORRECTION

Patent No. 3,586,438 Dated June 22, 1971

Inventor(s) ROBERT P. GYORI

It is certified that error appears in the above-identified patent and that said Letters Patent are hereby corrected as shown below:

On the title page, at INID number [54] after "AUTOMATIC" delete "CURING" and insert therefor --CUING--.

Column 1, Line 2, in the title after "AUTOMATIC" delete "CURING" and insert therefor --CUING--; Line 32, before "physically" delete "dues" and insert therefor --cues--.

Column 12, Line 6, after "providing" delete "a synchronous" and insert therefor --asynchronous--; Line 39, after "state" delete "of" and insert therefor --by--.

Signed and sealed this 30th day of May 1972.

(SEAL)
Attest:

EDWARD M.FLETCHER,JR.
Attesting Officer

ROBERT GOTTSCHALK
Commissioner of Patents